United States Patent [19]

Choat

[11] E Re. 31,481

[45] Reissued Jan. 3, 1984

[54] SHEAR TYPE TREE CUTTING DEVICE

[76] Inventor: Joseph S. Choat, Rte. 1, Box 358, Odenville, Ala. 35120

[21] Appl. No.: 80,307

[22] Filed: Oct. 1, 1979

Related U.S. Patent Documents

Reissue of:

[64] Patent No.: 3,493,020
Issued: Feb. 3, 1970
Appl. No.: 611,936
Filed: Jan. 26, 1967

[51] Int. Cl.[3] ..... A01G 23/08

[52] U.S. Cl. ..... 144/34 E; 83/928; 144/339

[58] Field of Search ..... 83/928; 56/15.9, 328 TS, 56/338; 144/2 Z, 3 D, 34 R, 34 E, 309 AC, 339

[56] References Cited

U.S. PATENT DOCUMENTS

| | | | |
|---|---|---|---|
| 2,612,194 | 9/1952 | Ingraham | 144/34 E |
| 2,748,813 | 6/1956 | Ford | 144/34 E |
| 2,876,816 | 3/1959 | Busch | 144/3 D |
| 2,882,941 | 4/1959 | Pope | 144/3 X |
| 3,074,446 | 1/1963 | Earl | 144/3 |
| 3,102,563 | 9/1963 | Horncastle | 144/3 D |
| 3,183,953 | 5/1965 | MacMillan et al. | 144/34 E |
| 3,294,131 | 12/1966 | Larson | 144/3 X |

FOREIGN PATENT DOCUMENTS

| | | | |
|---|---|---|---|
| 163836 | 10/1964 | U.S.S.R. | 144/34 E |

OTHER PUBLICATIONS

*Mechanizing Timber Thinning,* in Traktor Journalen, NR 5, Apr. 20, 1966, pp. 372–373 (Sweden).

*Will the Garp-Fist Solve the Problem of Thinning Within the Mechanized Forestry* in Skogsägaren NR May 5, 1966, p. 155, (Sweden).

*"Garpenbergs-Fist" New Tool to Forestry,* In Falv-Kuriren, Mar. 24, 1966, pp. 8, 9 & 11, (Sweden).

*Science Fiction in Dala Forest, "The Fist" Like a Monster,* In Dala-Demokraten, Mar. 24, 1966, (Sweden).

*Forest Robot at Garpenberg, A World Novelty, "The Garp-Fist", A New Grip on Thinning,* In Avesta-Thinning, Mar. 24, 1966, (Sweden).

*Primary Examiner*—W. D. Bray

[57] ABSTRACT

An elongated frame including tree clamping jaw means at one end and a shear-type cutting blade supported from the frame for movement therealong between an inactive position remote from the jaw means and an active position cooperable with the jaw means to shear a tree member clampingly engaged by the jaw means, the frame being pivotally supported from the forward end of a mobile platform for pivotal movement about a horizontal axis extending transversely of the frame and the mobile platform and vertically adjustable relative to the latter.

4 Claims, 6 Drawing Figures

10
12
14
16
18
20
22
24
26
28
30
32
34
36
38
40
42
44
46
48
50
52
54
56
58
60
62
64
72
86
96
104
110
114
116
118
120
122
124
126
128
130
132
134
136
138
140
144

56
64
66
76
82
80
140
108
110
104
84
60
72

46
128
132
124
114
116
118
24
26
56
10
70
64
66
72
18
20

3
3
46
32
30
132
134
136
138
140
144
128
130
126
124
114
116
118
120
24
26
10
38
34
36
44
42
104
110
60
62
96
86
50
52
66
72
64
54
22
56
58
20

SHEAR TYPE TREE CUTTING DEVICE

Matter enclosed in heavy brackets [ ] appears in the original patent but forms no part of this reissue specification; matter printed in italics indicates the additions made by reissue.

This invention relates to a novel and useful shear-type tree cutting device and to a device which may be readily attached to various types of mobile vehicles and which may be constructed of substantially any size desired so as to be capable of felling trees of various sizes.

The cutting device of the instant invention includes an elongated guide structure or frame having tree trunk or limb clamping means at one end adapted to clampingly engage an upright portion of a tree when the frame is horizontally disposed and the frame has shear-type cutting blade means supported therefrom for longitudinal reciprocation between an inactive position remote from the jaw means and an active position cooperable with the jaw means to shear the trunk of a tree clampingly engaged by the jaw means. The guide member or frame is pivotally supported from any suitable mobile vehicle for rotation about a horizontal axis extending transversely of the direction of movement of the vehicle and also transversely of the elongated frame, the axis of rotation about which the frame may be angularly displaced also being vertically adjustable relative to the associated mobile vehicle. In this manner, the cutting device of the instant invention may not only be utilized to fell upright trees but to also cut the trunk portions of felled trees as well as the larger limb portions thereof. Still further, the cutting device of the instant invention also includes a pushing member supported from the associated mobile vehicle in a manner so as to engage a tree which is to be felled appreciably above the shear-type cutting blade and the pushing member is supported from the associated vehicle in a manner so as to be shiftable in a direction generally paralleling the reciprocal movement of the shear-type cutting blade whereby the pusher or pushing member may be utilized to push the upper portion of a tree away from the associated vehicle while the lower portion of the trunk of the tree is being sheared by the shear-type cutting blade.

The main object of this invention is to provide a tree cutting device operable to quickly fell trees of a given size.

Another object of this invention, in accordance with the immediately preceding object, is to provide a tree cutting device which will also be operable to quickly cut the trunk portion of a felled tree at a plurality of points spaced longitudinally therealong.

Yet another object of this invention is to provide a tree cutting device which may be readily supported from any suitable mobile vehicle such as a farm tractor or the like.

A further object of this invention is to provide a tree cutting device adapted for support from a conventional farm tractor or the like and which will be operative to fell trees and then cut the trunk portions thereof in short sections without requiring an operator other than the operator of the farm tractor.

A final object of this invention to be specifically enumerated herein is to provide a shear-type tree cutting device in accordance with the preceding objects which will conform to conventional forms of manufacture, be of simple construction and eas yto use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
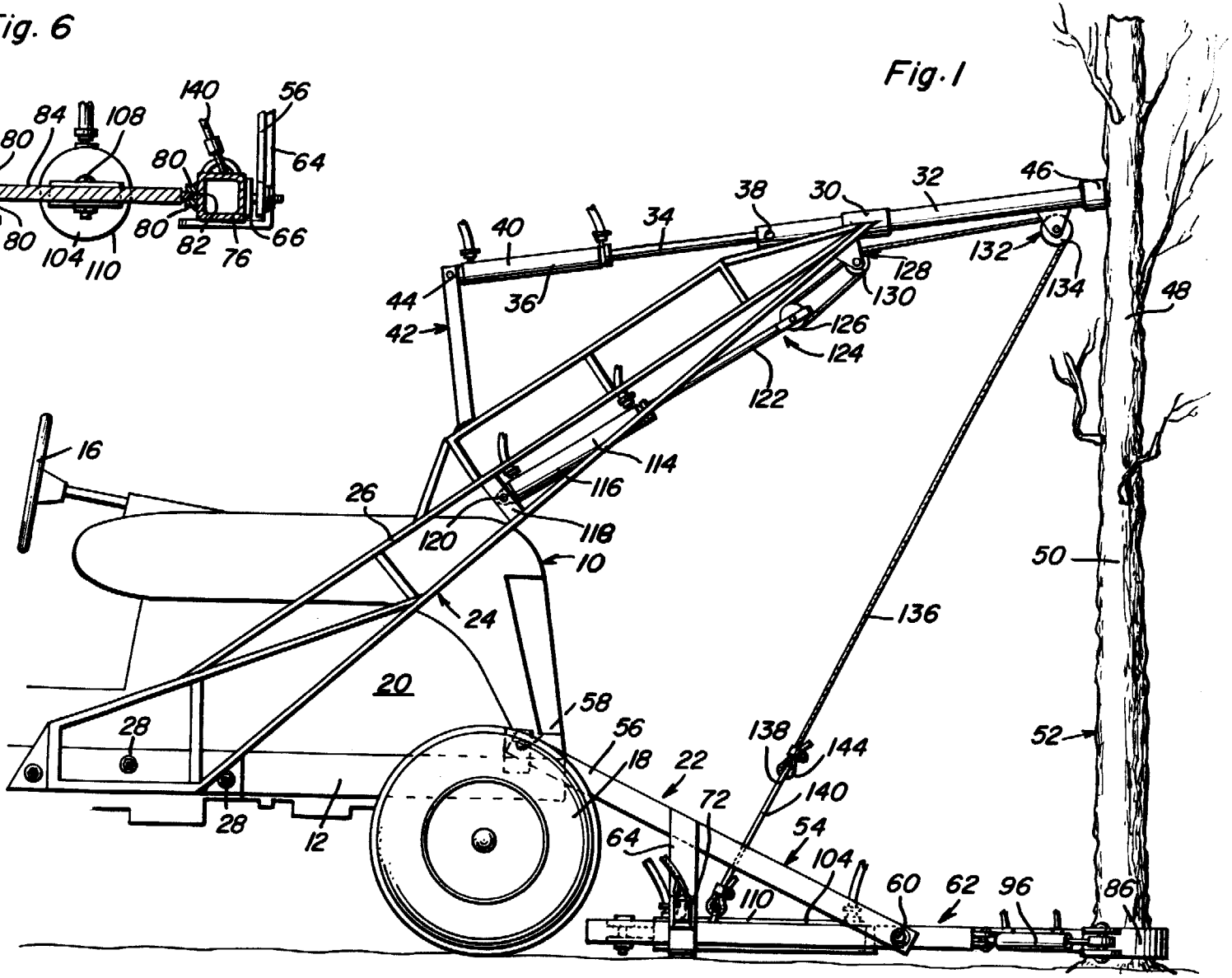
FIG. 1 is a fragmentary side elevational view of the front portion of a conventional farm tractor or the like upon which the tree cutting device of the instant invention is operatively mounted and illustrating the tree cutting device in position to fell a tree.
Figure 6:
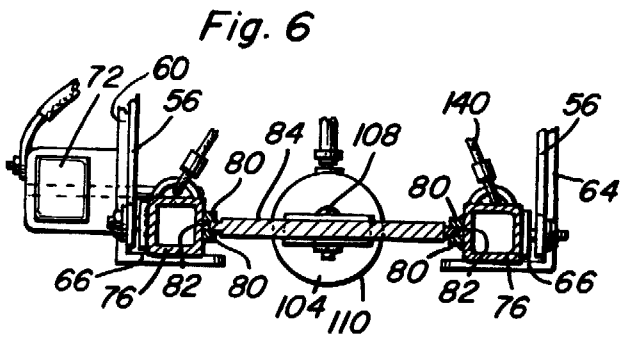
Figure 3:
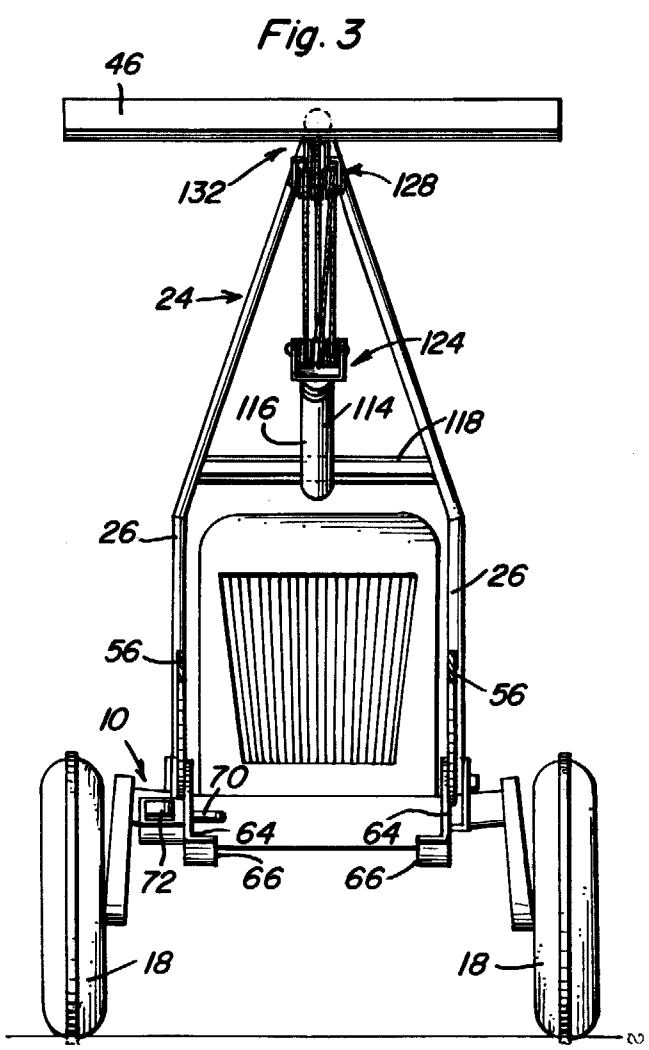
FIG. 3 is a vertical transverse sectional view taken substantially upon the plane indicated by the section line 3—3 of FIG. 2.
Figure 4:
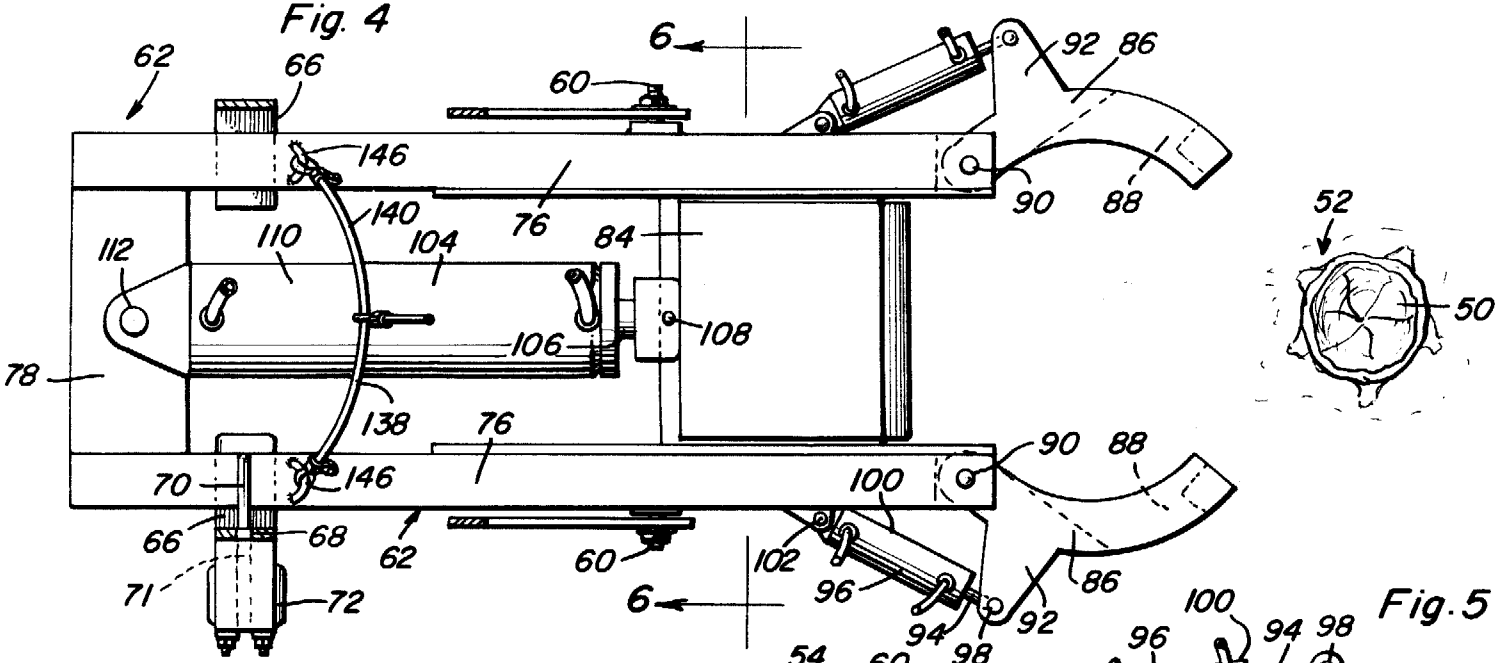
Figure 5:
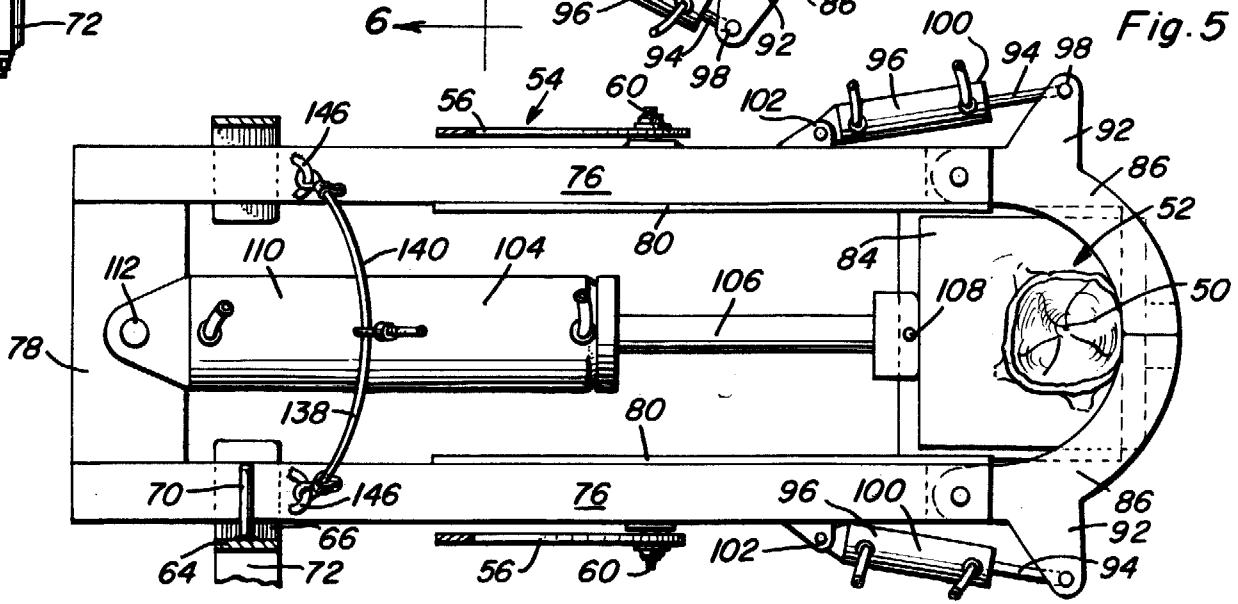

FIG. 4 is a fragmentary top plan view of the elongated frame portion of the tree cutting device which supports tree trunk clamping means at one end and includes a longitudinally reciprocal shear-type cutting member, portions of supporting structure for the frame being illustrated in horizontal section and the jaws of the clamp means being illustrated in their open positions to receive a tree trunk therebetween;

FIG. 5 is a view similar to FIG. 4 but illustrating the jaw members of the clamp means in closed position about a tree trunk which is being cut by the reciprocal cutting blade of the device; and FIG. 6 is a fragmentary transverse vertical sectional view taken substantially upon the plane indicated by the section line 6—6 of FIG. 4.

Referring now more specifically to the drawings in the numeral 10 generally designates any suitable form of mobile vehicle such as a farm tractor including a main frame 12 and an operator's position 14 adjacent the steering wheel 16 of the tractor 10. The tractor 10 includes dirigible front wheels 18 controlled by the steering wheel 16 and rear driving wheels (not shown). Further, the tractor 10 also includes an engine 20 suitably drivingly connected to the rear wheels in any convenient manner and which is operable to drive a hydraulic pump of a fluid pressure system (not shown).

The shear-type tree cutting device of the instant invention is generally designated by the reference numeral 22 and includes a forwardly and upwardly projecting support frame generally referred to by the reference numeral 24. The frame 24 includes a pair of similar opposite side skeleton frame members 26 suitably secured to corresponding side portions of the frame 12 at their lower ends in any convenient manner such a by fasteners 28. The forward upper ends of the frame members 26 are suitably rigidly interconnected in any convenient manner incluing an elevated sleeve-type guide 30. An elongated pushing arm 32 is longitudinally slidably received through the tubular guide 30 and has the free end of the piston rod portion 34 of a hydraulic cylinder 36 secured thereto as at 38. The cylinder portion 40 of the hydraulic cylinder 36 is pivotally supported from a standard assembly generally referred to by the reference numeral 42 carried by the support frame 24 as at 44. Accordingly, upon extension and retraction of the hydraulic cylinder 36 the pushing arm 34 will be reciprocated through the tubular guide 30, the forward end of the pushing arm 32 including a horizontally disposed and transversely extending crosshead 46 for engagement with an upper portion 48 of the trunk portion 50 of a tree generally referred to by the reference numeral 52 which is to be felled by the cutting device 22.

A vertically swingable arm assembly referred to in general by the reference numeral 54 includes a pair of arm members 56 having corresponding ends pivotally secured to opposite side portions of the frame 12 as at 58. The forward ends of the arm members 56 project forwardly of the front end of the frame 12 and rotatably journal therethrough a pair of opposite side oppositely and outwardly projecting stub axle portions 60 carried by an elongated frame referred to in general by the reference numeral 62. Accordingly, the frame 62 is oscillatable about the axis defined by the coaxial stub axle portions 60.

Each of the arm members 56 includes a depending portion or leg 64 intermediate its opposite ends which terminates downwardly in an inturned abutment flange 66 engageable by the undersurface portions of the rear end of the frame 62 when the latter is positioned as illustrated in FIGS. 1, 4, 5 and 6 of the drawings. Further, one of the legs 64 has an aperture 68 formed therethrough through which a locking pin 70 carried by the armature 71 of an electric solenoid 72 supported from the one leg 64 is removably received, the locking pin 70 overlying the adjacent portion of the frame 62 when in position as illustrated in FIGS. 1 and 4–6 of the drawings to retain the frame 62 in a substantially horizontally disposed position.

The frame 62 includes a pair of tubular opposite side members 76 rigidly interconnected at their rear ends by means of a heavy transverse member 78 and the confronting sides of the forward ends of the opposite side members 76 include pairs of vertically spaced ribs 80 defining opposing generally parallel channels in which the reduced thickness portions 82 extending along opposite side portions of a shear-type cutting blade 84 are slidably received.

The forward end portions of the outer side walls of the tubuar members 76 are cut away and a pair of arcuate jaw members 86 slotted as at 88 are pivotally secured between the forward end extremities of the upper and lower wall portions of the forward ends of the opposire side members 76 as at 90. Each of the jaw members 86 includes an outwardly projecting arm portion 92 having the free end of the piston rod portion 94 of a hydraulic cylinder 96 pivotally secured thereto as at 98, the end of the cylinder portion 100 of each fluid motor 96 remote from the piston rod portion 94 thereof being pivotally secured to the corresponding frame members 76 as at 102. Further, a very powerful hydraulic motor 104 has the free end of its piston rod portion 106 pivotally secured to the rear end of the shear-type cutting blade 84 as at 108 and the end of its cylinder portion 110 remote from the piston rod portion 106 pivotally secured to the transverse brace member 78 as at 112.

A fifth hydraulic cylinder 114 has the base end of its cylinder portion 116 pivotally supported from a cross brace 118 extending between the frame members 26 intermediate their opposite ends as at 120 and the free end of the piston rod portion 122 of the hydraulic cylinder 114 carries a sheave assembly referred to in general by the reference numeral 124 and including a plurality of rotatable pulley wheels 126. A second sheave assembly generally referred to by the reference numeral 128 and including a plurality of rotatable pulley wheels 130 is carried by the upper end of the support frame 24 adjacent the tubular guide 30 and a third sheave assembly 132 including a single rotatable pulley wheel 134 is carried by the forward end of the pushing arm 132.

Figure 2:
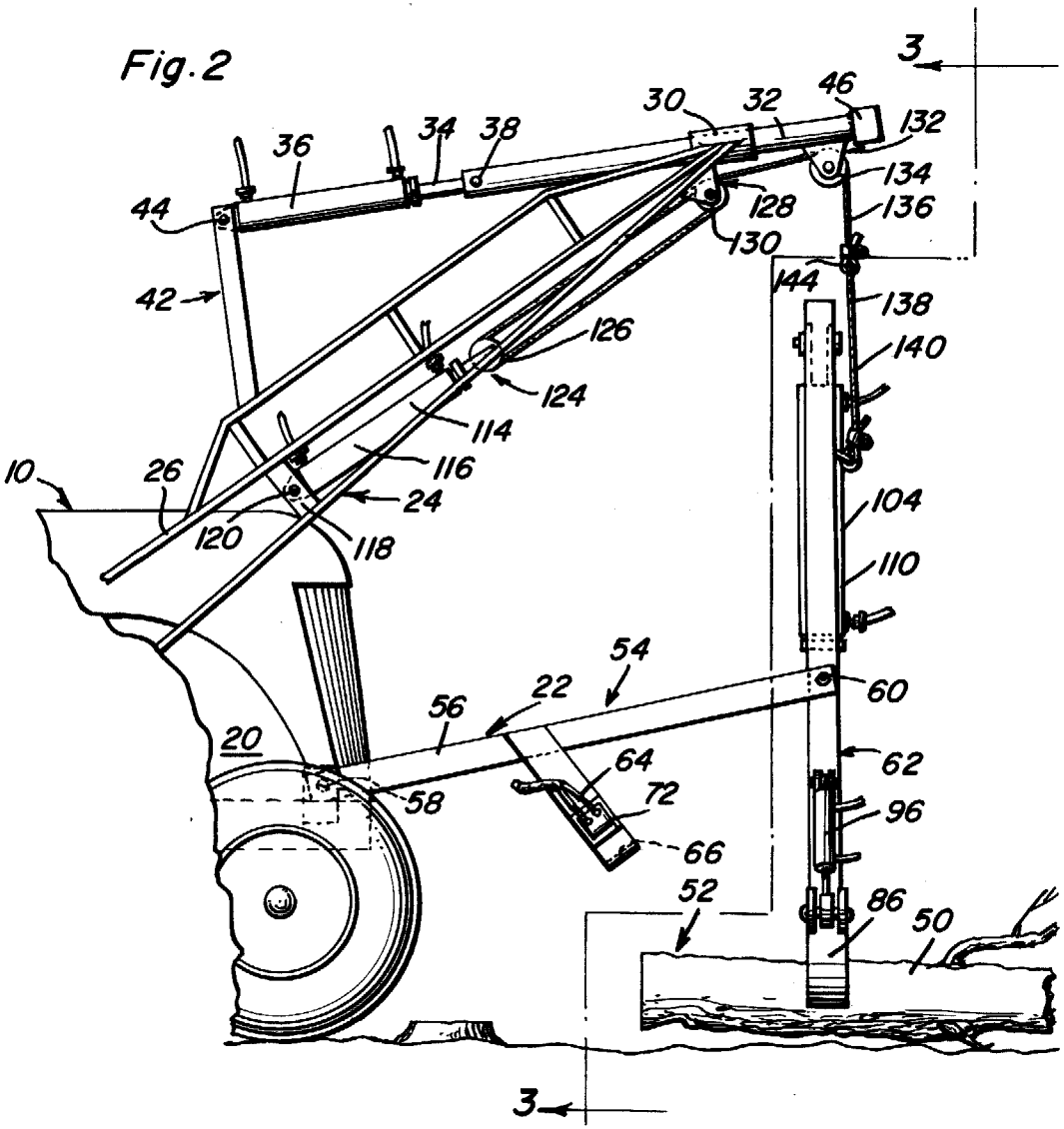
FIG. 2 is a fragmentary side elevational view similar to that of FIG. 1 but with the tree cutting device of the instant invention illustrated in position to cut the trunk portion of the felled tree into short sections.

An elongated flexible tension and pulling member 136 which may conveniently take the form of a cable has one end secured to the bight portion 138 of a bridle assembly 140 as at 144 and the bridle assembly 140 is secured to opposite side portions of the frame 62 as at 146. The other end of the tension and pulling member 136 is trained over the single pulley wheel 134, over one of the wheels 130 and then down under one of the wheels 126 before passing upwardly again and over a second of the wheels 130 and then being secured to the sheave assembly 124. Accordingly, retraction of the piston rod portion 122 of the hydraulic cylinder 114 will raise the rear end of the frame 62 and thus also raise the forward end of the arm assembly 54 if the pin 70 is in position. In this manner, the jaws or jaw members 86 may be raised in elevation relative to the trunk portion 50. Thereafter, the tractor 10 may be advanced toward the trunk portion 50 and the double-acting hydraulic cylinders 96 may be extended to cause the jaw members 86 to encircle and close behind the trunk portion 50. Then, the double-acting hydraulic cylinder 104 may be extended to urge the shear-type cutting blade 84 forwardly along the frame 62 so as to force its forward edge into shear cutting engagement with the trunk portion 50, through the latter and into the slots 88. At the same time, the double-acting hydraulic cylinder 36 may be extended so as to engage the crosshead 46 with the upper portion 48 of the trunk portion 50 and push the top portion of the tree 52 away from the tractor 10. After the trunk portion 50 has been cut by the blade member 84 and felled so as to be disposed upon the ground in a horizontal position such as that illustrated in FIG. 2 of the drawings, the tension on the pulling member 136 may be relaxed and the pin 70 may be withdrawn. Thereafter, the hydraulic cylinder 114 may be retracted so as to swing the frame 62 relative to the arm assembly 54 and to also cause the forward end of the arm assembly 54 to be swung upwardly. In this manner, the frame 62 and the arm assembly 54 may be swung from the positions thereof illustrated in FIG. 1 of the drawings to the position thereof illustrated in FIG. 2 of the drawings whereupon the tractor 10 may be advanced along the horizontally disposed trunk portion 50 and the hydraulic cyinder 114 may be intermittently extended so as to lower the frame 62 into position in which the jaw members 86 may be closed underneath the trunk portion 50. Thereafter, the hydraulic cylinder 104 may again be extended to cause the blade member 84 to cut the trunk portion 50 into short sections thereof by shearing action. Of course, the five hydraulic cylinders or fluid motors 36, 96, 96, 104 and 114 are each of the double-acting type and may be operatively connected to the aforementioned fluid pressure system (not shown) by any suitable manually actuatable control valves (not shown) disposed adjacent the operator's position 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

[1. A tree cutting device comprising a frame including opposite horizontally speed apart ends, said frame including first means at one end defining an endwise outwardly opening recess in which a tree trunk may be received upon advancement of said one end of said frame toward said trunk and abutment means shiftabe between inoperative and operative positions allowing free passage of a tree trunk into and out of said recess through the outer portion thereof and closing the outer portion of said recess, respectively, and a cutter blade longitudinally reciprocally supported from said frame including a horizontal cutting edge facing said one end of said frame and shiftable between an operative position which said cutting edge advanced into said recess and an inoperative position with said cutting edge retracted from within said recess toward the other end of said frame, a mobile platform movable in at least one direction, means carried by the leading end of said platform when the latter is advanced in said one direction pivotally supporting said frame from said platform for oscillation of the frame about a horizontal axis extending transversely of said frame and platform for swinging said frame within the horizontal position thereof with said one end facing in said one direction and a vertical position with said one end of said frame lowermost.]

[2. The combination of claim 1 wherein said axis is spaced forwardly of said platform.]

3. A tree cutting device comprising a frame, said frame including jaw means adapted to clampingly engage a cylindrical object specifically oriented adjacent said jaw means, and means carried by said frame adapting the latter to be supported for oscillation about a horizontal axis being operable to locate said axis spaced from but ajacent said jaws whereby the radius of the arc of swinging movement of said jaw means during oscillation of said frame will not be excessively great so as to limit freedom of oscillatory movement of said frame in heavily wooded areas, said frame being elongated and said jaw means being disposed adjacent at one end thereof, said frame including a shear-type cutting blade mounted thereon for reciprocal movement therealong between an inactive position remote from said jaw means and an active position cooperable with said jaw means to shear a tree member clampingly engaged by said jaw means, a mobile platform movable endwise in at least one direction, means carried by the leading end of said platform when the latter is advanced in said direction pivotally supporting said frame from said platform for rotation of the frame about a horizontal axis extending transversely of said frame and a platform and comprising the first-mentioned axis, said frame being swingable between generally horizontal and vertically disposed positions, said platform including a pusher member elevated above said jaw means when said frame is in a horizontal position and shiftable relative to said platform longitudinally thereof.

[4. The combination of claim 1 wherein said means carried by the leading end of said platform includes generally horizontal arm means pivotally secured at one end to said platform for vertical swinging movement about a horizontal axis extending transversely of said arm means and with the other end of said arm means projecting outwardly of said platform, said frame being pivotally supported from the other end of said arm means for oscillation about the first mentioned horizontal axis, the latter extending transversely of said arm means.]

[5. The combination of claim 4 including means connected between said platform and said arm means operative to raise and lower said other end of said arm means.]

[6. The combination of claim 5 wherein said arm means and said frame include means operative to releasably lock said frame against angular displacement relative to said arm means.]

[7. The combination of claim 6 wherein said arm means comprises a pair of generally parallel arm members between whose free swinging end portions said frame is pivotally supported.]

8. A tree cutting device comprising a frame, said frame including a jaw means adapted to clampingly engage a cylindrical object specifically oriented adjacent said jaw means, and means carried by said frame adapting the latter to be supported for oscillation about a horizontal axis through an arc of at least generally ninety degrees whereby said frame may be swung from a position in which said jaw means may grip an upright tree to a position in which said jaw means may grip a horizontally disposed tree portion, said means adapting said frame to be supported for oscillation about a horizontal axis being operable to locate said axis spaced from but adjacent said jaws whereby the radius of the arc of swinging movement of said jaw means during oscillation of said frame will not be excessively great so as to limit freedom of oscillatory movement of said frame in heavily wooded areas, said frame being elongated and said jaw means being disposed at one end thereof, said frame including a shear-type cutting blade mounted thereon for reciprocal movment therealong between an inactive position remote from said jaw means and an active position cooperable with said jaw means to shear a tree member clampingly engaged by said jaw means, said means carried by the leading end of said platform including generally horizontal arm means pivotally secured at one end to said platform for movement about a horizontal axis extending transversely of said arm means and with the other end of said arm means projecting outwardly of said platform, said frame being pivotally supported from the other end of said arm means for rotation about a horizontal axis extending transversely of said arm means, said means connected between said arm means and said platform including an elongated tension member supported at one end from said platform and secured to said frame at its other end.

9. The combination of claim 8 wherein said other end of said tension member is secured to the side of the axis of rotation of said frame relative to said arm means remote from said clamp means.

10. The combination of claim 9 wherein said arm means and said platform include coating means limiting downward swinging movement of the free end of said arm means.

[11. A tree cutting device comprising a frame including opposite horizontally spaced apart ends, said frame including first means at one end defining an endwise outwardly opening recess in which a tree trunk may be received upon advancement of said one end of said frame toward said trunk and abutment means shiftable between inoperative and operative positions allowing free passage of a tree trunk into and out of said recess through the outer portion thereof and closing the outer portion of said recess, respectively, and a cutter blade longitudinally reciprocally supported from said frame including a horizontal cutting edge facing said one end of said frame and shiftabe between an operative position with said cutting edge advanced into said recess and an inoperative position with said cutting edge retracted from within said recess toward the other end of said frame, said abutment means, when in said operative position, defining a slot extending transversely of said frame and opening outwardly along its longitudinal dimension toward the other end of said frame, said cutting edge of said cutter blade being received in said slot when said blade is in said operative position and the surfaces of said abutment means facing said other end of said frame being free of shear-type cutting edges.]

[12. The combination of claim 2 wherein said platform includes means for raising and lowering said axis relative to said platform.]

[13. A tree cutting device comprising a frame including opposite horizontally spaced apart ends, said frame including first means at one end defining an endwise opening recess in which a tree trunk may be received upon advancement of said one end of said frame toward said trunk and abutment means shiftable between inoperative and operative positions allowing free passage of a tree trunk into and out of said recess through the outer portion thereof and closing the outer portion of said recess, respectively, and a cutter blade longitudinally reciprocally supported from said frame including a horizontal cutting edge facing said one end of said frame and shiftable between an operative position with said cutting edge advanced into said recess and an inoperative position with said cutting edge retracted from within said recess toward the other end of said frame, said abutment means comprising a pair of arcuate jaw members pivotally supported at corresponding ends to said one end of said frame for oscillation about axes disposed generally normal to the plane in which said cutting edge is movable between open and closed positions with the free end portions of said jaw members swung away from each other and toward each other.

* * * * *